(12) United States Patent
Price et al.

(10) Patent No.: US 9,962,907 B2
(45) Date of Patent: May 8, 2018

(54) METHODS OF IMPARTING CONDUCTIVITY TO MATERIALS USED IN COMPOSITE ARTICLE FABRICATION AND MATERIALS THEREOF

(75) Inventors: Richard Thomas Price, Corona, CA (US); Abdel Abusafieh, Anaheim, CA (US)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 1584 days.

(21) Appl. No.: 12/971,869

(22) Filed: Dec. 17, 2010

(65) Prior Publication Data
US 2011/0159764 A1 Jun. 30, 2011

Related U.S. Application Data

(60) Provisional application No. 61/288,030, filed on Dec. 18, 2009.

(51) Int. Cl.
  *B32B 15/04* (2006.01)
  *B32B 7/02* (2006.01)
  (Continued)

(52) U.S. Cl.
  CPC ............ *B32B 15/08* (2013.01); *B32B 15/14* (2013.01); *B64D 45/02* (2013.01);
  (Continued)

(58) Field of Classification Search
  None
  See application file for complete search history.

(56) References Cited

U.S. PATENT DOCUMENTS 4,784,899 A * 11/1988 Ono et al. .................. 442/281
2002/0102390 A1* 8/2002 O'Neill et al. ............. 428/192
(Continued)

FOREIGN PATENT DOCUMENTS

DE 10149645 C1 1/2003

OTHER PUBLICATIONS

ISR/Written Opinion for PCT/US2010/059219 dated Mar. 31, 2011.

*Primary Examiner* — Shawn Mckinnon
(74) *Attorney, Agent, or Firm* — Thi Dang

(57) ABSTRACT

Embodiments of the invention are directed to metal- or metal alloy-coated sheet materials (hereinafter, "metal-coated sheet material") including, but not limited to, fabrics and veils which have a metal content of between one (1) and fifty (50) grams per square meter (gsm). The metal-coated sheet materials may be used as-is or in conjunction with prepregs, adhesives or surfacing films to provide lightning strike protection (LSP) and/or bulk conductivity, among other benefits, to the resultant composite article. In one embodiment, the metal-coated sheet material is impregnated with a resin. According to embodiments of the invention, a metal is applied to one or two sides of the fabric or veil by a physical vapor deposition coating process. The resultant metal-coated fabric or veil may be used as a carrier in surfacing films to impart surface conductivity; may be used as a carrier in adhesives to form conductive adhesive-bonded joints; may be interleaved (one or more metal-coated veils) between layers of prepreg to impart surface and/or bulk conductivity as well as toughness; or may be used to fabricate composite articles.

4 Claims, 5 Drawing Sheets

(51) Int. Cl.
  *B32B 15/08* (2006.01)
  *B32B 15/14* (2006.01)
  *B64D 45/02* (2006.01)

(52) U.S. Cl.
  CPC ...... *Y10T 428/265* (2015.01); *Y10T 442/3382* (2015.04); *Y10T 442/654* (2015.04)

(56) References Cited

U.S. PATENT DOCUMENTS

2010/0264266 A1* 10/2010 Tsotsis ...................... 244/117 R
2011/0017867 A1* 1/2011 Simmons et al. ............ 244/1 A

* cited by examiner

METHODS OF IMPARTING CONDUCTIVITY TO MATERIALS USED IN COMPOSITE ARTICLE FABRICATION AND MATERIALS THEREOF

FIELD OF INVENTION

Conductive materials for composite articles.

BACKGROUND OF INVENTION

Materials used in the fabrication of component parts in the aerospace industry must have certain characteristics to protect the parts from damage or hazards caused by common environmental occurrences. Lightning, an example of a common environmental occurrence, can severely damage and/or punch through component parts if such parts are not adequately conductive and grounded through the aircraft. If lightning strikes a wing component of an aircraft during flight, the event has the potential of causing a dangerous surge current in addition to causing serious physical damage of the component itself. The surge current is particularly concerning because it may eventually come into contact with a fuel reservoir causing an explosion to occur. As a result of an actual fatal plane crash caused by a lightning strike, the Federal Aviation Administration (FAA) implemented a system to categorize various zones for commercial aircraft based on probability and severity of being struck by lightning. Thus, it is crucial that such component parts are manufactured to have characteristics which, among other characteristics, prevent or alleviate damage caused by lightning strikes.

Electromagnetic interference (EMI) is another electrical concern of composite parts in the aerospace industry. EMI waves consist of electric and magnetic fields which can induce electrical transients to induce excessive energy levels in the electrical wiring and probes of the fuel system. A method to prevent and/or reduce these occurrences is to add shielding materials to absorb or reflect the impinging radiation. Without proper shielding from these events, the waves can interfere with an aircraft's electronic and avionic equipment operation or even lead to ignition of fuel tanks. Absorption losses have been shown to be proportional to the thickness, conductivity and permeability of the shield material. Conventional shielding methods include housings made from cast and sheet metal, and plastics with conductive fillers or coatings.

Electrostatic discharge (ESD) is yet another concern for composite parts in the aerospace industry. ESD is the sudden and momentary electric current that flows between two objects at different electrical potentials caused by direct contact or induced by an electrostatic field. Non-conductive materials, paints, plastics have insulating properties and therefore are subject to accumulation of static charges. The resulting charges must be controlled to protect aircraft electronics and fuel tanks. Conventional ESD methods include adding fibers which have static elimination characteristics to a material, e.g., carbon fiber, or adding wicks and/or rods at the tips of aircraft components.

Static charge is imparted to a material through friction. An airplane becomes charged simply by passing through the air. Flight through precipitation (clouds or rain) increases charge accumulation, as there is more material contact. Static charge is routinely discharged in air at sea level, which is slightly conductive, and also in air with higher humidity. However, air with humidity below 20 percent and/or at higher altitudes is a poor conductor. The latter permits static charge to build up on aircraft surfaces, especially those of composite aircraft, where charge does not readily move. The build-up of charge on a structure creates a voltage potential that increases with the amount of charge. On metal structures, this voltage potential is the same everywhere because metal conducts electricity evenly. On composite structures, however, the voltage will vary. This voltage potential, in turn, generates an electric field which is most intense at areas of acute curvature such as wing tips, propeller tips, trailing edges, tips and edges of jet engine blades, etc. Built-up charge wants to travel-like charges repel and unlike charges attract. Eventually, the difference in charge between the air and structure becomes so great that the need to discharge the voltage potential takes over, resulting in a mass "dumping" of the excess charge into the atmosphere. Static charge build-up can trigger lightning within clouds or in charged atmospheric conditions.

At the same time, such component parts must be manufactured to target certain weight requirements in order for the aircraft to achieve designed distance and also to overcome the gravitational force of its own weight to gain flight without using an inordinate amount of fuel. Additionally, such component parts must be manufactured to resist damage to common environmental occurrences. This characteristic is generally described as "toughness" with respect to composites. Thus, concerns of damage tolerance and resistance to common environmental occurrences while maintaining a practicable weight of these component parts must be evaluated very carefully in the manufacturing process of such parts. Various methods are used to strike this balance in the manufacturing process.

A conventional method for imparting lightning strike protection to component parts in the aerospace industry is the use of expanded aluminum, copper, titanium or bronze mesh, screen or foils, or woven wire fabrics, incorporated into the composite part. Although such meshes are generally effective as lightning strike protection, many of these expanded mesh/screens are difficult to handle for both production and repairs. Additionally, they generally require isolation materials (e.g., a fiberglass isolator ply) to prevent undesirable galvanic corrosion in the presence of other materials, especially aluminum with carbon composite structures. Moreover, when used in large quantities, expanded mesh/screens are very heavy and may significantly add to the weight of the overall part thereby decreasing the efficiency of the aircraft.

Another method of imparting lightning strike protection is the use of metal-coated carbon fiber material incorporated into the composite part. Generally, the carbon fibers are coated with nickel, palladium, tin, copper or a combination thereof using an electroless plating process. These metal-coated fibers may then be formed into a uniform nonwoven material. The nonwoven material with metal-coated fibers is incorporated into the composite effectively replacing the metal mesh/screen which would otherwise be needed for adequate lightning strike protection. Reports of composite parts having such nonwoven materials with metal-coated fibers therein are reported to have a metal content of between about sixty (60) and one-hundred (100) grams per square meter (gsm) of metal. Other reports cite a 10% to 65% metal by weight content for carbon tows between 6K (6000 filaments) to 80K (80,000 filaments). The metal-coated veil materials are made with metal-coated fibers lightly bonded together with non-conductive resin (e.g., PVA). Thus, the weight of the overall composite still presents issues with respect to efficiency of the aircraft. Moreover, the electroless

SUMMARY OF INVENTION

A support material, comprising: (i) a sheet material; and (ii) a layer of a metal or metal alloy on at least one side of the sheet material wherein the layer of metal has a thickness of between 0.1μ and 25μ, the metal-coated sheet material combined with one of a film, resin or a ply is herein disclosed. In some embodiments, the layer of metal has a thickness between 0.5μ and 2μ. An areal weight of the metal on the metal-coated sheet material may be less than 50 grams per square meter. In some embodiments, an areal weight of the metal on the metal-coated sheet material is less than 15 grams per square meter. In other embodiments, an areal weight of the metal on the metal-coated sheet material is less than 5 grams per square meter. The metal-coated sheet material may be conductive, the metal-coated sheet material having a surface resistivity less than a surface resistivity of a sheet material. The sheet material may be one of a woven fabric or a nonwoven veil. A material comprising the sheet material may be a fibrous material including one of carbon, fiberglass, ceramic or organic fibers including aramid, para-aramid, nylon, thermoplastic or a combination thereof.

In some embodiments, the metal or metal alloy is one of aluminum, copper, silver, nickel, palladium, tin, gold or a combination thereof. Furthermore, the metal-coated sheet material may be coated by a process selected from the group consisting of physical vapor deposition, atomic layer deposition, chemical vapor deposition, low pressure chemical vapor deposition and plasma-enhanced chemical vapor deposition. The metal may be coated on the sheet material in a continuous layer. The film or ply may be one of a fibrous reinforcement in the form of a sheet, tape, tow, fabric or mat and preimpregnated with resin, an adhesive film or a surfacing film. A support material comprising the film or resin may be a polymeric material wherein the polymeric material is at least one of epoxy, bismaleimide, phenolic, cyanate ester and polyimide. The sheet material may be combined with at least one ply to form a laminate structure. Alternatively, the sheet material may be interleaved between a plurality of plies to form a laminate structure.

A composite article, comprising: (i) a plurality of plies, each ply adjacent at least one other ply: and (ii) at least one nonwoven mat having a coating of metal or metal alloy on at least one side thereon adjoining at least one ply wherein an areal weight of the coating on the nonwoven mat is less than 50 grams per square meter is herein disclosed. In some embodiments, the areal weight of the coating is between 3 gsm and 20 gsm. In one embodiment, at least one nonwoven mat having a coating of metal or metal alloy on at least one side thereon is interleaved between the plurality of plies to form a laminate panel, the laminate panel having bulk conductivity. The laminate panel may be characterized by an increase in a compression after impact value when subjected to a force relative to a laminate panel without at least one nonwoven mat having a coating of metal or metal alloy on at least one side interleaved therein. Furthermore, the laminate panel may be characterized by an increase in a toughness value when the panel is loaded after a crack is introduced thereto relative to a laminate panel without at least one nonwoven mat having a coating of metal or metal alloy on at least one side interleaved therein. In another embodiment, the at least one nonwoven mat is adjoining an outermost ply to form a laminate panel, the laminate panel capable of mitigating damage when a voltage of up to 200,000 amps makes contact with the laminate panel.

The layer of metal on the coated nonwoven mat may have a thickness between 0.5μ and 2μ. A material comprising the sheet material may be a fibrous material including one of carbon, fiberglass, ceramic or organic fibers including aramid, para-aramid, nylon, thermoplastic or a combination. In some embodiments, the metal or metal alloy may be one of aluminum, copper, silver, nickel, palladium, tin, gold or a combination thereof. Furthermore, the metal-coated nonwoven mat may be coated by a process selected from the group consisting of physical vapor deposition, atomic layer deposition, chemical vapor deposition, low pressure chemical vapor deposition and plasma-enhanced chemical vapor deposition. The metal may be coated on the sheet material in a continuous layer. Each ply may be a fibrous reinforcement in the form of a sheet, tape, tow, fabric or mat and preimpregnated with resin. Furthermore, each ply may be unidirectional or quasi-isotropic.

A manufacturing process, comprising: (i) positioning a sheet material having a coating of metal or metal alloy on at least one side thereon wherein an areal weight of the coated sheet material is less than 50 grams per square meter onto a tool; (ii) positioning a ply adjoining the coated sheet material; and (iii) applying pressure and heat to the coated sheet material and the at least one ply to form a laminate panel is herein disclosed. More narrowly, the areal weight of the coating may be between 3 gsm and 20 gsm. The manufacturing process may further comprise positioning a plurality of adjacent plies on the ply adjoining the coated sheet material. The manufacturing process may further comprise interleaving a plurality of coated sheet materials with the plurality of plies. In some embodiments, the sheet material is a nonwoven mat, more particularly, a fibrous material including one of carbon, fiberglass, ceramic or organic fibers including aramid, para-aramid, nylon, thermoplastic or a combination. In some embodiments, the metal or metal alloy is one of aluminum, copper, silver, nickel, palladium, tin, gold or a combination thereof. In some embodiments, the layer of metal on the nonwoven mat has a thickness between 0.5μ and 2μ. The metal-coated nonwoven mat may be coated by a process selected from the group consisting of physical vapor deposition, atomic layer deposition, chemical vapor deposition, low pressure chemical vapor deposition and plasma-enhanced chemical vapor deposition. Each ply may be a fibrous reinforcement in the form of a sheet, tape, tow, fabric or mat and preimpregnated with resin. Each ply may be unidirectional or quasi-isotropic.

DETAILED DESCRIPTION

Figure 1A:
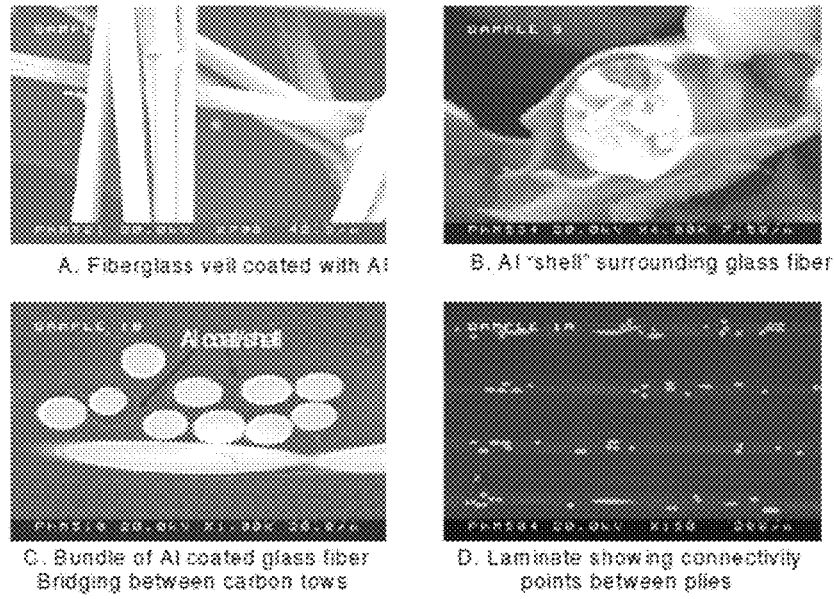
FIG. 1A shows SEM photographs of representative metal-coated fiberglass nonwoven mats (veils).

The following detailed description is of the best currently contemplated modes of carrying out the invention. The description is not to be taken in a limiting sense, but is made merely for the purpose of illustrating the general principles of the invention.

Embodiments of the invention are directed to metal- or metal alloy-coated sheet materials (hereinafter, "metal-coated sheet material") including, but not limited to, fabrics and veils which have a metal content of between one (1) and fifty (50) grams per square meter (gsm). The metal-coated sheet materials may be used as-is or in conjunction with prepregs, adhesives or surfacing films to provide lightning strike protection (LSP) and/or bulk conductivity, among other benefits, to the resultant composite article. In one embodiment, the metal-coated sheet material is impregnated with a resin. According to embodiments of the invention, a metal is applied to one or two sides of the fabric or veil by a physical vapor deposition coating process. The resultant metal-coated fabric or veil may be used as a carrier in surfacing films to impart surface conductivity; may be used as a carrier in adhesives to form conductive adhesive-bonded joints; may be interleaved (one or more metal-coated veils) between layers of prepreg to impart surface and/or bulk conductivity as well as toughness; or may be used to fabricate composite articles.

In the context of this application, an "adhesive" is a bonding agent for bonding composites to composites, composites to metal and other materials (including honeycomb sandwich core materials), and metal to metal. In aerospace applications, structural adhesives reduce or eliminate mechanical fasteners and the labor, weight and strength-reducing holes they impart. Film adhesives may be provided in roll form, and can include support materials or "carriers". Carriers provide integrity for handling, control flow during cure, increase adhesive strength, manage bondline thickness and may impart a conductivity to the adhesive. Carriers include low-density knit or non-woven materials such as fiberglass, quartz, carbon fiber, nylon, polyester or metal. According to embodiments of the invention, a carrier may include a metal-coated sheet material.

In the context of this application, a "surface film" is a resin-rich layer applied to composites to fill in surface imperfections, such as pinholes, surface cracks, core mark-off and other imperfections, thereby reducing labor-intensive manufacturing costs required to remove those imperfections. The resin may include a carrier such as low-density knit or non-woven materials including fiberglass, quartz, carbon fiber, nylon, polyester or metal. According to embodiments of the invention, a carrier may include a metal-coated sheet material.

In the context of this application, a "prepreg" is a resin-impregnated and directionally aligned fiber thin sheet, e.g., fabric, tape or slit tape. In one method, prepregs are made by sandwiching fiber tows (bundles of small diameter fibers) between sheets of carrier paper that are coated with a resin matrix. Upon pressing the carrier paper over the fiber tows using heated rollers, the resin melts and impregnates the fibers thus forming a prepreg. The resin matrix may include, but are not limited to, materials such as standard or toughened epoxies, bismaleimides (BMI), cyanate esters, phenolics, reaction and condensation polyimides, and combinations thereof. The fibers, or "reinforcements", may include, but are not limited to, materials such as Kevlar, fiberglass, quartz, carbon, graphite and specialty fibers. According to embodiments of the invention, a reinforcement may include a metal-coated sheet material.

According to embodiments of the invention, a sheet material (i.e., an engineered textile) may be coated with a metal or combination of metals to impart a level of conductivity to the sheet material. The sheet material may be, but is not limited to, a woven or nonwoven veil or fabric comprised of fibers or a blend of fibers. Materials comprising the sheet material include, but are not limited to, fiberglass, carbon, thermoplastic (e.g., KM 180), aramid, para-aramid (Kevlar™) and blends and/or combinations thereof. In some embodiments, the coating thickness may be between about 0.1 microns ($\mu$) and about 25$\mu$, more narrowly, between about 0.5$\mu$ and 2$\mu$.

According to embodiments of the invention, the metal coating may be applied to the sheet material by a physical or chemical process which coats the sheet material with a very thin layer of metal. Such processes include, but are not limited to, physical vapor deposition (PVD), atomic layer deposition (ALD), chemical vapor deposition (CVD), low pressure CVD, plasma-enhanced CVD or any other suitable process. In one application, a PVD process is used to coat one side or both sides of the sheet material. Physical vapor deposition (PVD) is a method of depositing thin films by the condensation of a vaporized form of the metal onto various surfaces. The coating method involves purely physical processes and variants of the method include evaporative deposition, electron beam physical vapor deposition, sputter deposition, cathodic arc deposition and pulsed laser deposition and are known by one of ordinary skill in the art. In any embodiment, the metal used to coat one or both sides of the sheet material include, but are not limited to, aluminum (Al), copper (Cu), silver (Ag), palladium (Pd), tin (Sn), gold (Au), copper-nickel (Cu—Ni), copper-aluminum (Cu—Al) combinations thereof and any other suitable metal with like characteristics.

Embodiments of the present invention provide for a support material, comprising a sheet material and a layer of a metal or metal alloy on at least one side of the sheet material wherein the layer of metal has a thickness of between 0.1$\mu$ and 25$\mu$, the metal-coated sheet material combined with one of a film, resin or a ply. The layer of metal may have a thickness between 0.5$\mu$ and 2$\mu$ and the areal weight of the metal on the metal-coated sheet material is less than 50 grams per square meter or more preferably is less than 15 grams per square meter.

Further embodiments of the present invention provide for a composite article, comprising a plurality of plies, each ply adjacent at least one other ply and at least one nonwoven mat having a coating of metal or metal alloy on at least one side thereon adjoining at least one ply wherein an areal weight of the coating on the nonwoven mat is less than 50 grams per square meter. The areal weight of the coating is between 3 gsm and 20 gsm. The support material for the composite article has the layer of metal on the coated nonwoven mat at a thickness between 0.5$\mu$ and 2$\mu$ and a material comprising the sheet material is a fibrous material including one of carbon, fiberglass, ceramic or organic fibers including aramid, para-aramid, nylon, thermoplastic or a combination. The support material for the composite article has the metal or metal alloy being one of aluminum, copper, silver, nickel, palladium, tin, gold or a combination thereof. The metal-coated nonwoven mat is coated by a process selected from the group consisting of physical vapor deposition, atomic layer deposition, chemical vapor deposition, low pressure chemical vapor deposition and plasma-enhanced chemical vapor deposition and the metal is coated on the sheet material in a continuous layer wherein the ply is a fibrous reinforcement in the form of a sheet, tape, tow, fabric or mat and preimpregnated with resin.

A further embodiment of the present invention involves a manufacturing process, comprising positioning a sheet material having a coating of metal or metal alloy on at least one side thereon wherein an areal weight of the coated sheet material is less than 50 grams per square meter onto a tool, positioning a ply adjoining the coated sheet material and applying pressure and heat to the coated sheet material and the at least one ply to form a laminate panel. The areal weight of the coating is between 3 gsm and 20 gsm. The manufacturing process may further involve positioning a plurality of adjacent plies on the ply adjoining the coated sheet material. The process may also involve interleaving a plurality of coated sheet materials with the plurality of plies.

The manufacturing process may use a sheet material that is a nonwoven mat that is made of a fibrous material including one of carbon, fiberglass, ceramic or organic fibers including aramid, para-aramid, nylon, thermoplastic or a combination. The metal or metal alloy is one of aluminum, copper, silver, nickel, palladium, tin, gold or a combination thereof wherein the layer of metal on the nonwoven mat has a thickness between $0.5\mu$ and $2\mu.38$.

The manufacturing process may involve the metal-coated nonwoven mat being coated by a process selected from the group consisting of physical vapor deposition, atomic layer deposition, chemical vapor deposition, low pressure chemical vapor deposition and plasma-enhanced chemical vapor deposition and the ply is a fibrous reinforcement in the form of a sheet, tape, tow, fabric or mat and preimpregnated with resin.

Conductivity Assessment.

Electrical conductivity ($\sigma$) is an intrinsic physical property of a material independent of the size or shape of the sample. Resistivity ($\rho$) is a physical property of a material to resist or oppose the movement of charge (current flow) through the material and is inversely related to conductivity. A material with low resistivity is highly conductive, and vice-versa. According to embodiments of the invention, fabrics and veils may be imparted with a conductive characteristic by application of a metal coating between about $0.1\mu$ and $25\mu$, more particularly about $0.5\mu$ and $2\mu$, by a physical vapor deposition process or similar process.

Example 1

Various veils and fabrics were coated using physical vapor, deposition (PVD) to test the conductivity of the resultant metal-coated veils and fabrics. The metal was coated in one or more continuous layers. Carbon, fiberglass and thermoplastic veils (woven and non-woven) with metal coatings ranging from about $0.5\mu$ to about $2\mu$ in thickness (one-sided or two-sided coatings) were coated using a PVD chamber. Fiberglass and carbon fabrics (woven and non-woven) with metal coatings ranging from about $0.5\mu$ to about $2\mu$ in thickness (one-sided or two-sided coatings) were also coated using the same vacuum chamber.

The following Table 1 lists representative results of metal-coated sheet materials according to embodiments of the invention and compared with standards:

TABLE 1

| Metal | Thickness ($\mu$) | Sides Coated | Areal Weight (gsm) | Areal Weight difference (gsm) |
|---|---|---|---|---|
| Carbon veil (reference) | N/A | N/A | N/A | 11.4 | N/A |
| Carbon veil | Al | $1\mu$ | 1 | 13.5 | 2.1 |
| Carbon veil | Al | $1\mu$ | 2 | 14.4 | 3.0 |
| Carbon veil | Cu | $1\mu$ | 1 | 13.4 | 2.0 |
| Carbon veil | Cu | $1\mu$ | 1 | 26.3 | 14.9 |
| Carbon veil | Cu | $1\mu$ | 2 | 28.2 | 16.8 |
| Fiberglass veil (reference) | N/A | N/A | N/A | 11.0 | N/A |
| Fiberglass veil | Al | $1\mu$ | 1 | 11.2 | 0.2 |
| Fiberglass veil | Al | $1\mu$ | 2 | 12.7 | 1.7 |
| Fiberglass veil | Al | $1\mu$ | 2 | 12.1 | 1.1 |
| Fiberglass veil | Al | $0.5\mu$ | 1 | ~11.1 | ~0.1 |
| Fiberglass veil | Al | $2\mu$ | 1 | 11.5 | 0.5 |
| Fiberglass veil | Cu | $1\mu$ | 1 | 15.4 | 4.4 |
| Carbon fabric | N/A | N/A | N/A | 205 | N/A |
| Carbon fabric | Cu | $1\mu$ | 1 | 210 | 10 |
| Carbon fabric | Cu | $1\mu$ | 2 | 217 | 12 |

As illustrated by the above Table 1, the sheet materials coated with metal using a PVD process resulted in metal-coated veils with an areal weight of metal of less than 5 gsm. Similarly, the sheet materials coated with metal using a PVD process resulted in metal-coated fabrics with an areal weight of metal of less than 15 gsm. Thus, the metal-coated sheet materials according to embodiments of the invention resulted in a very low weight veil, e.g., an increase of about five (5) gsm for veils and an increase of about fifteen (15) gsm for fabrics when compared with, e.g., prior art veils incorporating metal which have a final areal weight of at least one-hundred (100) gsm or greater (e.g., combined weight of veil and metal).

Moreover, metal-coated sheets according to embodiments of the invention were experimentally shown to have a significant decrease in surface resistivity (and, therefore, a significant increase in conductivity) when compared to prior art sheets. For example, a conventional carbon veil (8 gsm) with no metal coating was found to have an average surface resistance of 5 ohms. By comparison, a silver metal-coated carbon veil (between about $2\mu$ to $5\mu$ metal thickness) according to embodiments of the invention was found to have an average surface resistance of 11.2 milli-ohms. Similarly, a copper metal-coated carbon veil (between about $2\mu$ to $5\mu$ metal thickness according to embodiments of the invention was found to have an average surface resistance of 75.2 milli-ohms. Comparison of the data for samples prepared according to embodiments of the invention therefore showed a decrease in surface resistance of at least fifty (5) times compared to that of a convention sample. A Megger DLRO10X Digital Low Resistance Ohmmeter was used to measure resistance of samples.

Metal-coated veils and fabrics according to embodiments of the invention may be used in a variety of applications to fabricate composite articles in, e.g., the aerospace industry. In one embodiment, the metal-coated veils may be interleaved with prepreg plies to form a laminate with conductive properties or applied as a surface layer to a plurality of stacked plies. The resultant laminates have been experimentally shown to withstand a Zone 1A lightning strike (200,000 amps) and, in the interleaved embodiment, experimentally shown to exhibit bulk conductivity as well as increased toughness.

Representative laminates incorporating a metal-coated veil or veils (one-sided or two-sided) according to embodiments of the invention and interleaved between plies were prepared according to the following example.

Example 2

Laminates were fabricated to determine the effect of through-laminate bulk resistance of the interleaved, metal-coated veil. Mechanical properties of these laminates were also tested. Plies of prepreg (i.e., prepreg carbon fabric with either 0% or 10% particle toughening) were assembled by known methods with and without interleaved metal-coated veils according to embodiments of the invention. Both unidirectional and quasi-isotropic laminates were tested.

The following Table 2 lists representative results of resistivity measurements of laminates prepared with at least one metal-coated veil according to embodiments of the invention and compared with standards:

TABLE 2

|  | Orientation | Thickness Cm | Bulk resistivity (ohm-cm) | | |
|---|---|---|---|---|---|
|  |  |  | Through thickness | Through width | Through length |
| 0% tough, no veil | (0)26 | 0.373 | 1358 | 50.0 | 0.042 |
| 0% tough, Cu-coated veil | (0)26 | 0.386 | 17.2 | 0.147 | 0.012 |
| 10% tough, no veil | (0)26 | 0.391 | >10,000 | 13.6 | 0.026 |
| 10% tough, Cu-coated veil | (0)26 | 0.396 | 33.2 | 0.111 | 0.010 |
| 10% tough, Al-coated veil | (0)26 | 0.401 | 1351 | 0.521 | 0.011 |
| OHC - 0% tough, no veil | (45.0, −45.90)2s | 0.226 | >10,000 | 0.208 | 0.051 |
| OHC - 0% tough, Cu-coated veil | (45.0, −45.90)2s | 0.234 | 51.3 | 0.075 | 0.012 |
| Tensile - 10% tough, no veil | (0)8 | 0.117 | 8768 | 11.0 | 0.017 |
| Tensile - 10% tough, Al-coated veil | (0)8 | 0.124 | 1821 | 0.402 | 0.007 |

Prepregs such as carbon fabric infused with epoxy resins are generally non-conductive in view of the resin incorporated therein and, therefore, electrical current is greatly inhibited from passing through it. Similarly, veils made of organic, fiberglass or synthetic material (used in interleaving in the fabrication of laminate panels) are generally non-conductive. Therefore, a conventional laminate formed with one or more conventional prepreg plies and one or more conventional veils will generally exhibit no or low bulk conductivity or surface conductivity (unless a metal mesh or foil is incorporated thereon).

Because the metal-coated veils according to embodiments of the invention were interleaved between non-conductive plies, it would be anticipated that the resultant laminates may show some conductivity but would exhibit little to no bulk conductivity. This would be expected since it would be reasonable to assume that there were not an adequate number of conductive paths between the plies based on the interleaving.

However, as shown in Table 2, the improvements in through-thickness conductivity (measured as resistivity in Ohms-cm) in laminates fabricated according to embodiments of the invention are between one to three orders of magnitude compared to conventional laminates (no interleaving veils). Improvements were also observed in through width and through length conductivity (see Table 2). These results were unexpected since, in order to provide through-thickness conductivity, there must be an adequate number of conductive paths between the plies.

While the laminates fabricated according to embodiments of the invention exhibited unexpectedly high bulk conductivity characteristics, the overall cured ply thickness (CPT) did not significantly increase relative to non-interleaved laminates. It was experimentally shown that the CPT of laminates fabricated according to embodiments of the invention increased less than 3.5% relative to non-interleaved laminates.

Morphology.

An investigation was conducted to elucidate the morphology of the metal-coated sheet materials according to embodiments of the invention. A Scanning Electron Microscope (SEM) was used to photograph cross-sectioned, polished metal-coated veils. FIG. 1A show SEM photographs of representative metal-coated fiberglass veils. Because PVD is a surface-coating process, it was anticipated that the metal or metal alloy coating would be limited to a layer of a certain thickness on the surface of the veil. However, the SEM photographs revealed that the metal was able to penetrate interstitial spaces (to some degree) between the randomly ordered "web" of fibers of the veil resulting in coated fibers and coated groups of coated fibers. For fibers (or groups of fibers) that are in contact with one another at various points, e.g., adjacent fibers or crossing fibers, the metal coating forms around the adjacent fibers or the cross-point as if they are "one" fiber. Thus, as a result of the randomly ordered nature of the fibers in the veil, metallic "webs" are formed throughout the veil when subjected to the PVD surface coating process. When interleaved between prepreg plies to form a laminate panel, these metallic "webs" form connective bridges between the plies. As a result, the laminate panels fabricated according to embodiments of the invention exhibited unexpectedly high bulk conductivity characteristics.

Compared to prior art conductivity imparting processes in which fibers are coated (e.g., by electroless plating) and then formed into a nonwoven mat or fabric, the nonwoven mats and fabrics are coated on a surface (one side) or surface (two sides) by PVD or an equivalent process. This imparts sufficient lightning strike protection to resultant laminate panel while not significantly increasing the weight of the mat or fabric. For example, nonwoven mats fabricated according to prior art methods (e.g., electroless plating) have a final areal weight of approximately as one-hundred (100) gsm compared to nonwoven mats fabricated according to embodiments of the invention which have metal weights of under five (5) gsm and about fifteen (15) gsm for fabrics.

Mechanical Properties.

In addition to the unexpected results with respect to conductivity (as described above), the laminates fabricated according to embodiments of the invention unexpectedly exhibited an increase in toughness and damage resistance/tolerance without adversely affecting tensile or compressive strength properties when compared with laminates fabricated with no interleaving. The following table highlights the enhanced mechanical properties:

TABLE 3

|  | 0% tough plies with metal-coated interleaved layers | 10% tough plies with metal-coating interleaved layers |
|---|---|---|
| Compression After Impact (CAI/ksi) | 40-50% increase in CAI over no-interleaf laminates | No appreciable change |
| Toughness ($G_{IC}$/J/m$^2$) | >100% increase in $G_{IC}$ over no-interleaf laminates | ~40% increase in $G_{IC}$ over no-interleaf laminates |
| Tensile strength | No appreciable change | No appreciable change |
| Tensile strain | No appreciable change | No appreciable change |
| Compression strength | No appreciable change | No appreciable change |

Figure 2:
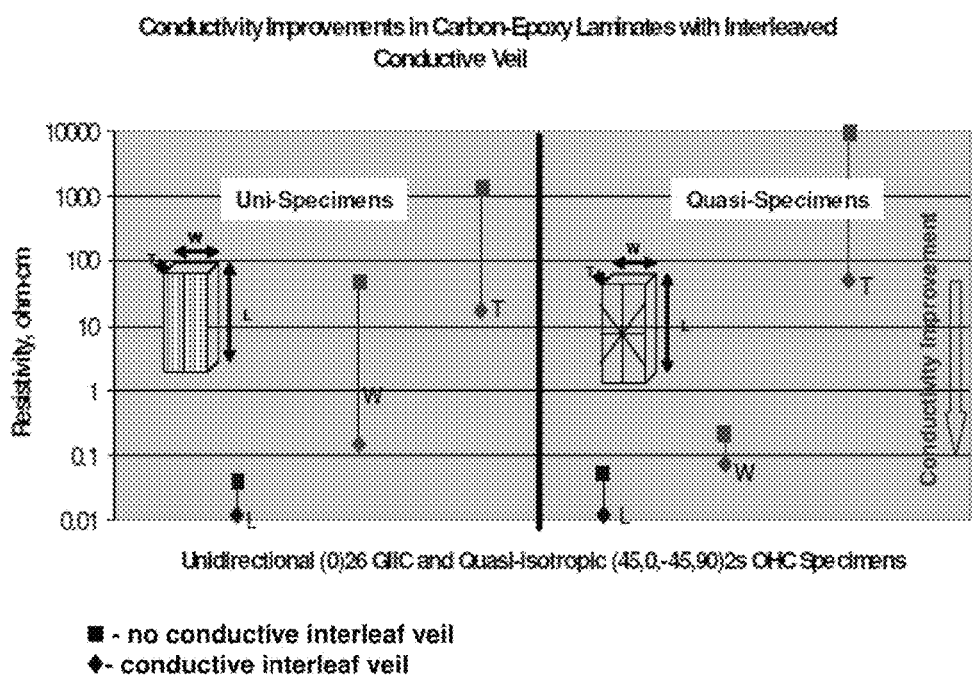
FIG. 2 illustrates length, width and thickness bulk resistivity values for laminates fabricated according to embodiments of the invention compared to conventional laminates for unidirectional and quasi-isotropic specimens.

Compression After Impact, or CAI, is a measurement of the damage resistance/tolerance of a laminate. Damage resistance measures the integrity of the laminate when it experiences a drop-weight impact event while damage tolerance measures the integrity of the laminate after being subjected to a quasi-static indentation even. Generally, the higher the CAI value, the more the laminate is damage resistant/tolerant. Toughness, or $G_{IC}$, is a measurement of the resistance of the laminate to the propagation of a crack. Toughness is measured by loading a sample containing a deliberately-induced crack of a given length, calculating a fracture toughness ($K_{IC}$), then calculating a toughness using the fracture toughness value and other constants. Generally, the higher the $G_{IC}$ value, the more the laminate is microcrack resistant. FIG. 2 illustrates length, width and thickness bulk resistivity values for laminates fabricated according to embodiments of the invention and conventional laminates for both unidirectional (0)26 and quasi-isotropic (45,0,−45, 90)2s specimens. As shown, laminates fabricated according to embodiments of the invention show increased conductivity improvement in length, width and thickness bulk resistivity compared to conventional laminates in either specimen.

As shown in Table 3, mechanical properties of damage resistance/tolerance (CAI) and toughness ($G_{IC}$) for laminate panels were greatly enhanced with the metal-coated veil interleaf according to embodiments of the invention as compared to laminate panels with no-interleaf specimens. Moreover, the modified laminate panels simultaneously exhibited little to no affect on tensile or compressive strength properties. Thus, laminate panels fabricated with metal-coated veils according to embodiments of the invention and interleaved therein resulted in multi-functional laminate panels. More particularly, the laminate panels according to embodiments of the invention resulted in multi-functional laminate panels with enhanced functionality with respect to bulk conductivity, mechanical properties (e.g., strength and toughness) and the passing of Zone 1A lightning strike tests.

Figure 1B:
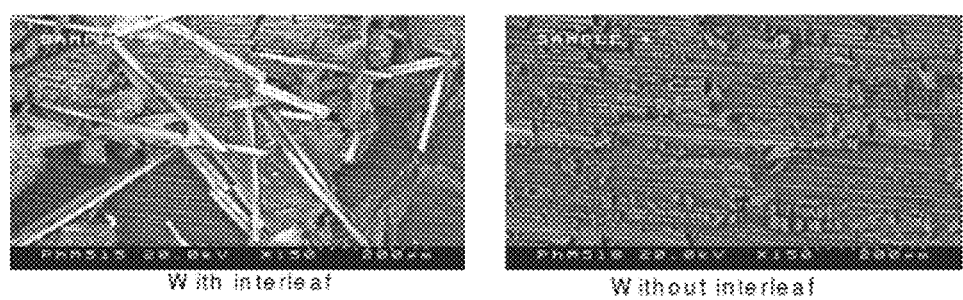
FIG. 1B shows SEM photographs of fracture surface interface with a metal-coated interleaf (metal-coated veil) according to embodiments of the invention and without an interleaf.
Figure 1C:
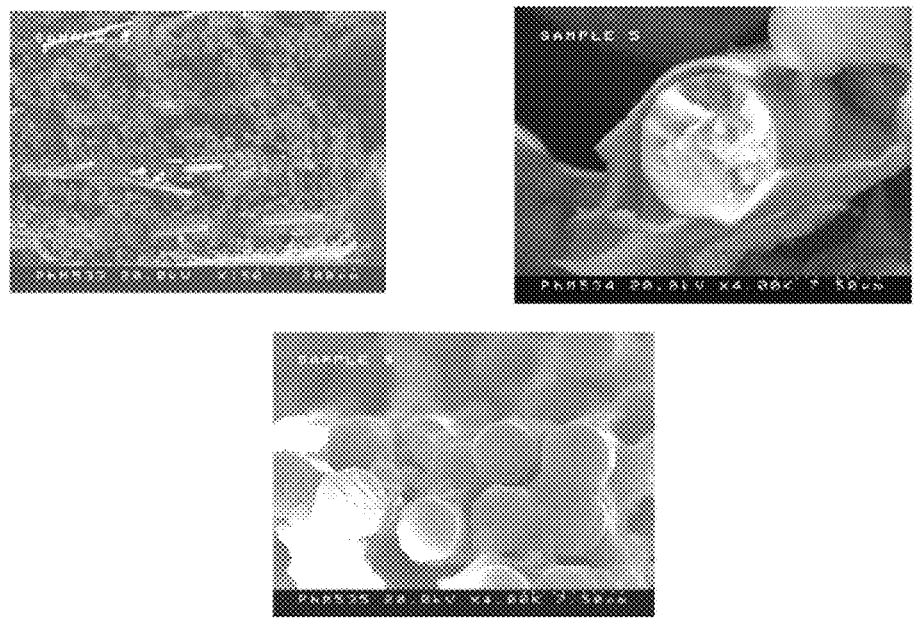
FIG. 1C shows SEM photographs of metal-coated fibers of a nonwoven mat (veil) according to embodiments of the invention after being subjected to strength and stress tests.

In addition to the above, scanning electron microscope (SEM) images were taken to study the multi-functional laminates fabricated according to embodiments of the invention after various stress, strain and impact tests were performed on the structures. It was discovered that the metal-coated veil interleaf (in this case, fiberglass) provided a fibrous interface creating a tortuous path for suppressing delamination and crack propagation (see FIG. 1B). Moreover, it was discovered that the strain energy was uniform as specimens were loaded. Moreover, it was discovered that cracks imparted on the laminate stayed within the same play. Moreover, it was discovered that the metal coating remained intact after subjected to various damage-inducing events (see FIG. 1C).

Environmental Impact Resistance.

As a result of an actual fatal plane crash caused by a lightning strike, the Federal Aviation Administration (FAA) implemented a system to categorize various zones for commercial aircraft based on probability and severity of being struck by lightning. The areas of concern are categorized as Zones 1A-1C, 2A-2B and 3, with Zone 1A (200,000 amps) being the most crucial with respect to withstanding a lightning strike.

Laminate panels fabricated according to embodiments of the invention were subjected to simulated lightning strikes of up to 200,000 amps. To test the degree of lightning strike protection (LSP), test panels were painted on the lightning strike side with an epoxy primer and urethane topcoat to typical aerospace thickness. A toughened carbon/epoxy 8-ply panel having one metal-coated veil (silver or copper) according to embodiments of the invention and subjected to a Zone 1A test yielded the following results: (i) damage was limited to approximately 1.5 to 2.5 plies; the backside of the test panel was unaffected; and (iii) the delamination area was determined to be about seven (7) in$^2$ to eight (8) in$^2$. For comparison purposes, a toughened carbon/epoxy 8-ply panel without a metal-coated veil and subjected to a Zone 1A test yielded the following results: (i) damage through all eight plies with hole on the backside of panel' and (ii)—delamination area about thirty-six (36) in$^2$. Thus, the laminate panels according to embodiments of the invention were shown to be very effective as lightning strike protection (LSP) compared to prior art panels.

In addition to evidencing sufficient LSP, it is anticipated that the laminate panels will protect from other potentially harmful electrical events such as electrostatic discharge (ESD), static charge build-up, electromagnetic interference (EMI), wing edge glow potential, current return network (CRN) and high intensity related fields (HIRF).

Figure 3:
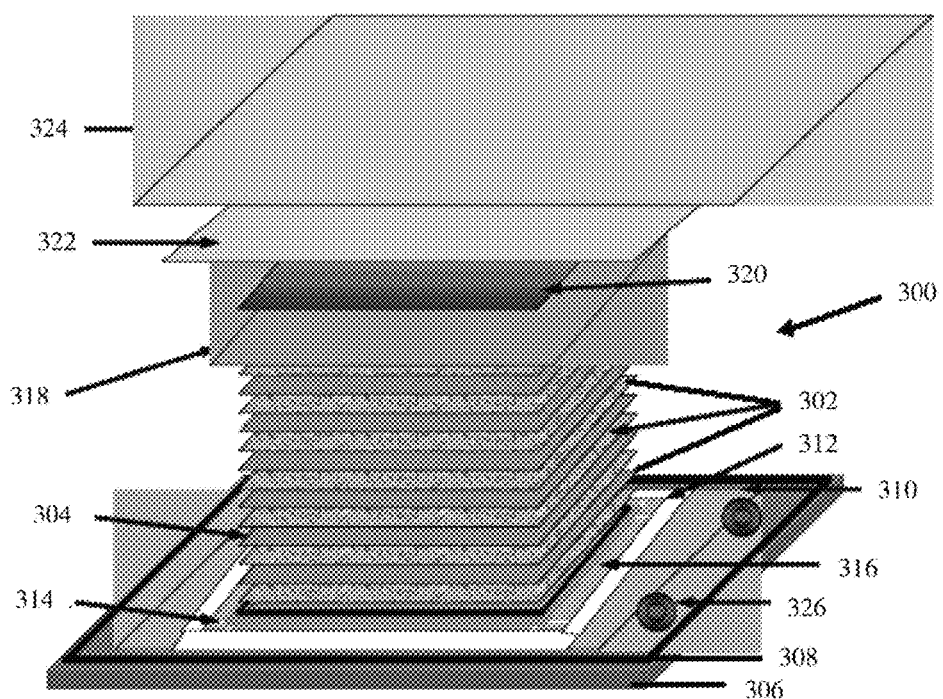
FIG. 3 illustrates a lay-up of a plurality of plies and a plurality of metal-coated nonwoven veils according to an embodiment of the invention in the process of being assembled for a vacuum bag process.

FIG. 3 illustrates a lay-up of a plurality of plies and a plurality of metal-coated nonwoven veils according to an embodiment of the invention in the process of being assembled for a vacuum bag process. As shown, a lay-up 300 comprised of a plurality of metal-coated veils 302 interleaved with a plurality of fabric plies 304 (i.e., adjoining) is prepared by layering a veil 302, then a fabric ply 304, and then repeating until the desired number of layers is achieved. The fabric plies 304 can be unidirectional, woven or multi-axial (i.e., non-crimp fabrics) and may be positioned in a unidirectional, quasi-isotropic or orthotropic orientation as known by one of ordinary skill in the art. The metal-coated veil 302 may be any one of the embodiments as described previously. The fabric ply may be made of fiberglass, carbon, aramid fibers or any other suitable fiber.

The lay-up 300 may be positioned on a mold or tool 306 wherein the surface of tool 306 is pre-prepared by positioning tacky tape 308 about a periphery therein, a gasket felt 310 (e.g., Armalon® felt) and a boat cloth 312 thereon. Fiberglass string 314 may be positioned to define a border of a silicone dam 316. A film of resin 318 such as fluorinated ethylene-propylene copolymer (FEP) may be positioned on lay-up 300 followed by a pressure plate 320, one or more fiberglass layers 322 and sealed by a vacuum bag 324. The system is in communication with one or more ports, such as vacuum port 326. Pressure and heat is applied thereto to cure the multi-functional prepreg plies thereby forming the laminate panel with bulk conductivity and enhanced toughness and strength. It should be appreciated that other processes may be used to form prepregs according to embodiments of the invention such as, but not limited to, an autoclave process, a match molding process, a tube rolling process and an oven cure/vacuum pressure process.

Figure 4:
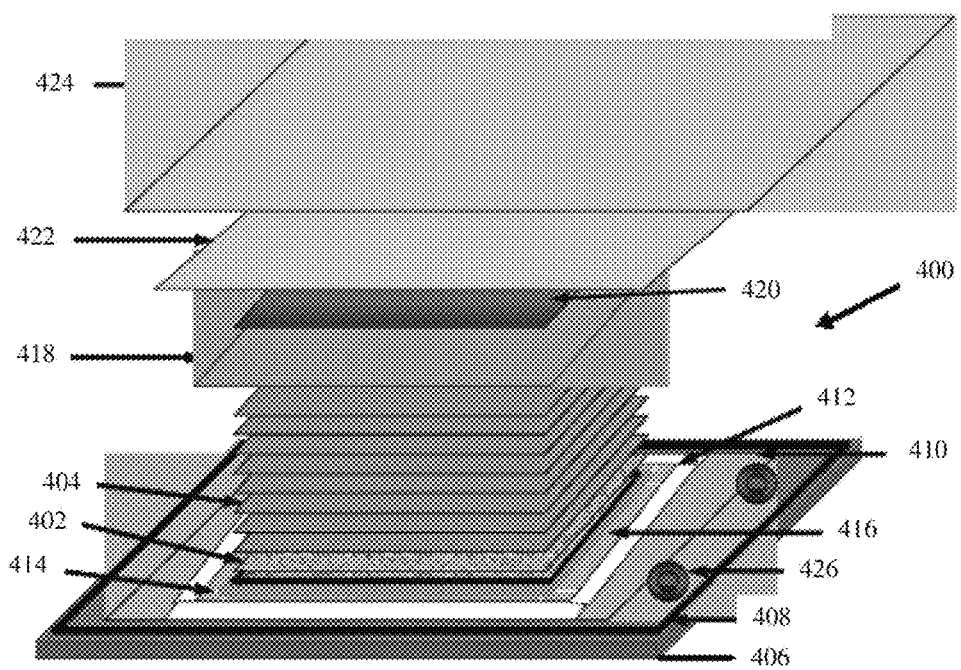
FIG. 4 illustrates a lay-up of a plurality of plies and a metal-coated nonwoven veil according to an embodiment of the invention in the process of being assembled for a vacuum bag process.

In another embodiment, a metal-coated veil according to embodiments of the invention may be applied as a surface layer to a plurality of stacked plies (lay-up) to form a laminate with conductive properties. FIG. 4 illustrates a lay-up of a plurality of plies and a metal-coated nonwoven veil according to an embodiment of the invention in the process of being assembled for a vacuum bag process. As shown, a lay-up 400 comprised of a metal-coated veil 402 positioned as a first layer adjacent a plurality of fabric plies 404. The fabric plies 404 can be unidirectional, woven or multi-axial (i.e., non-crimp fabrics) and may be positioned in a unidirectional, quasi-isotropic or orthotropic orientation as known by one of ordinary skill in the art. The metal-coated veil 402 may be any one of the embodiments as described previously. The fabric ply may be made of fiberglass, carbon, aramid fibers or any other suitable fiber.

The lay-up 400 may be positioned on a mold or tool 406 wherein the surface of tool 406 is pre-prepared by positioning tacky tape 408 about a periphery therein, a gasket felt 410 (e.g., Armalon® felt) and a boat cloth 412 thereon. Fiberglass string 414 may be positioned to define a border of a silicone dam 416. A film of resin 418 such as fluorinated ethylene-propylene copolymer (FEP) may be positioned on lay-up 400 followed by a pressure plate 420, one or more fiberglass layers 422 and sealed by a vacuum bag 424. The system is in communication with one or more ports, such as vacuum port 426. Pressure and heat is applied thereto to cure the finished multi-functional prepreg plies thereby forming a laminate panel with bulk conductivity and enhanced toughness and strength.

In an alternative embodiment, a metal-coated fabric according to embodiments of the invention can be used to fabricate a conductive prepreg without the use of veils. According to this embodiment, the metal-coated fabric, or ply, can be positioned in a lay-up as described with respect to FIG. 3 or 4 but without the interleaved metal-coated veils and/or surface-positioned metal-coated veil. It is anticipated that the resulting prepreg will have the same or substantially the same characteristics as the resulting prepregs fabricated according to those described in FIG. 3 or 4. That is, the resulting prepregs fabricated with one or more metal-coated fabric plies are anticipated to exhibit bulk conductivity characteristics as well as enhanced toughness and lightning strike resistance without the need for interleaving metal-coated veils.

In another embodiment, a metal-coated veil according to embodiments of the invention may be combined with an adhesive to form a conductive adhesive. According to this embodiment, the metal-coated veil serves as a carrier to the adhesive. Carriers may provide integrity for handling, control flow during cure, increase adhesive strength and manage bondline thickness. According to this embodiment, the metal-coated veil would function as a carrier to the adhesive to, among other benefits, provide lightning strike protection attributable to the conductivity of the carrier of the finished adhesive film. Materials which may comprise the adhesive include, but are not limited to, epoxy, bismaleimide, phenolic, cyanate ester, polyimide, combinations thereof and any other like material.

In another embodiment, a metal-coated veil according to embodiments of the invention may be combined with a surfacing film to form a conductive surfacing film. According to this embodiment, the metal-coated veil serves as a carrier to the surfacing film. According to this embodiment, the metal-coated veil would function as a carrier to the surfacing film to, among other benefits, provide lightning strike protection attributable to the conductivity of the carrier of the finished surfacing film. Materials which may comprise the surfacing film include materials which are ultra-low in volatiles and include advantageous properties related to gel, flow, drape, cyclic durability and paintability.

In another embodiment, a metal-coated veil or fabric according to embodiments of the invention may be impregnated with a resin to form a toughened conductive veil or fabric. The resin may include, but is not limited to, epoxy, polyimide, organic resins. A processing method such as solution-coated process, hot-melt process or any other suitable process may be used to impregnate the metal-coated veil which processes are known by one of ordinary skill in the art.

Component parts fabricated with composites combined with metal-coated veils or fabrics according to embodiments of the invention may be used in the manufacture of any aerospace component including those on commercial, military, business or regional jet, rotorcraft and jet engines that require the composite to have conductive properties. These would include, aircraft structure in FAA-defined lightning strike areas (Zones 1A-1C, 2A-2B, 3), e.g., wings, fuselages; and aircraft structure requiring protection from potentially harmful electrical events such as electrostatic discharge (ESD), static charge build-up, electromagnetic interference (EMI), wing edge glow potential, current return network (CRN) and high intensity related fields (HIRF).

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:
1. A laminate structure comprising a plurality of prepreg plies interleaved with a plurality of metal-coated sheet materials such that each metal-coated sheet material is positioned between adjacent prepreg plies,
wherein
each metal-coated sheet material comprises a layer of a metal or metal alloy coated on at least one side of a nonwoven veil, said layer of metal or metal alloy having an areal weight of less than 5 gsm, the nonwoven veil comprises carbon fibers, and each prepreg ply comprises reinforcement fibers pre-impregnated with a resin, the reinforcement fibers being selected from the group consisting of carbon fibers, graphite fibers, fiberglass fibers, quartz fibers, para-aramid fibers, and combinations thereof.

2. The laminate structure of claim 1, wherein the metal or metal alloy is selected from the group consisting of aluminum, copper, silver, nickel, palladium, tin, gold and a combination thereof.

3. The laminate structure of claim 1, wherein the resin in each prepreg ply comprises a material selected from the group consisting of epoxy, bismaleimide, phenolic, cyanate ester, polyimide, and combinations thereof.

4. The laminate structure of claim 1, wherein the layer of metal or metal alloy has a thickness between 0.5 μm and 2 μm.

* * * * *